INVENTORS
DONALD J. CHESAREK
HAROLD E. PETERSEN
BY
*Arthur Decker*
ATTORNEY

| SHIFT REGISTER B | | |
|---|---|---|
| SEQUENCE | CONFIGURATION OF MATRIX 12 | STATIC COUNT(S) |
| 13,6,11 | B1 = B1 ⊕ B2 | 0 |
| 9,4,2 | B1 = B1 ⊙ B2 | 15 |
| 14,7,11,5,2,9,12 | B1 = B1 ⊕ B3 | 0 |
| 13,6,3,1,8,4,10 | B1 = B1 ⊙ B3 | 15 |
| 15,7,11,5,10,13,6,3,9,4,2,1,8,12,14, (m-SEQUENCE SHOWN IN FIGURE 4) | B1 = B1 ⊕ B4 | 0 |
| 0,8,4,10,5,2,9,12,6,11,13,14,7,3,1, (m-SEQUENCE SHOWN IN FIGURE 5) | B1 = B1 ⊙ B4 | 15 |
| 14,7,3,9,4,10,13 | B1 = B2 ⊕ B3 | 0 |
| 12,6,11,5,2,1,8 | B1 = B2 ⊙ B3 | 15 |
| 15,7,3,9,12,14;1,8,4,10,5,2;6,11,13 | B1 = B2 ⊕ B4 | 0 |
| 0,8,13,6,3,1;14,7,11,5,10,13;9,4,2 | B1 = B2 ⊙ B4 | 15 |
| 15,7,3,1,8,4,2,9,12,6,11,5,10,13,14, (m-SEQUENCE) | B1 = B3 ⊕ B4 | 0 |
| 0,8,12,14,7,11,13,6,3,9,4,10,5,2,1, (m-SEQUENCE) | B1 = B3 ⊙ B4 | 15 |
| 14,7,3,1,8,12;2,9,4;6,11,13;5,10 | B1 = B1 ⊕ B3 ⊕ B4 | 0,15 |
| 15,7,11,5,2,1,0,8,4,10,13,14;12,6,3,9 | B1 = B1 ⊕ B3 ⊙ B4 | NONE |
| 14,7,11,5,2,9,12;1,8,4,10,13,6,3 | B1 = B2 ⊕ B3 ⊕ B4 | 0,15 |
| 15,7,3,9,4,2,1,0,8,12,6,11,13,14;5,10 | B1 = B2 ⊙ B3 ⊙ B4 | NONE |
| 14,7,3,9,4,10,13;12,6,11,5,2,1,8 | B1 = B1 ⊕ B2 ⊕ B4 | 0,15 |
| 15,7,11,13,6,3,1,0,8,4,2,9,12,14;5,10 | B1 = B1 ⊙ B2 ⊙ B4 | NONE |

FIG. 8

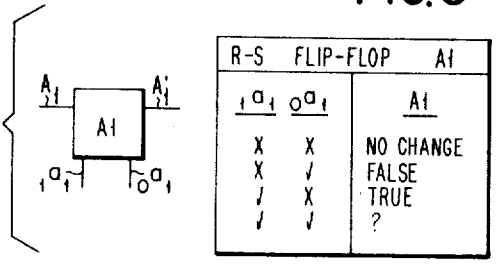

FIG. 2

| R-S FLIP-FLOP A1 | | |
|---|---|---|
| ₁a₁ | ₀a₁ | A1 |
| X | X | NO CHANGE |
| X | ✓ | FALSE |
| ✓ | X | TRUE |
| ✓ | ✓ | ? |

✓ INDICATES TRIGGERING OF THE INPUT.
X INDICATES NO TRIGGERING OF THE INPUT.
? INDICATES AN INDETERMINATE STATE; SIMULTANEOUS INPUTS ARE TO BE AVOIDED.

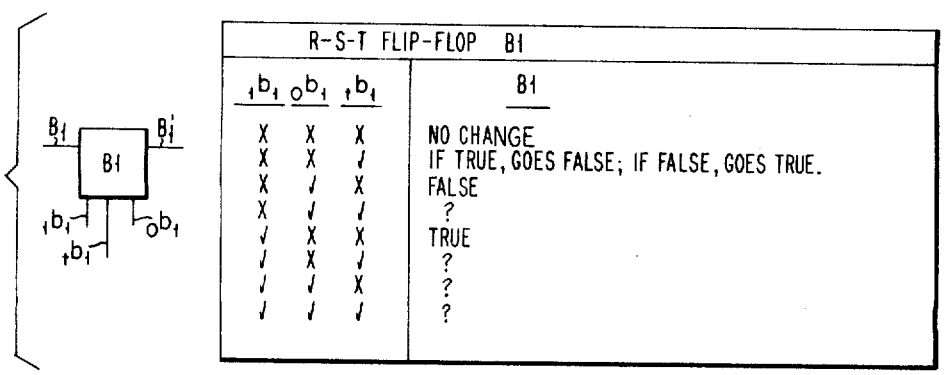

FIG. 3

| R-S-T FLIP-FLOP B1 | | | |
|---|---|---|---|
| ₁b₁ | ₀b₁ | ₜb₁ | B1 |
| X | X | X | NO CHANGE |
| X | X | ✓ | IF TRUE, GOES FALSE; IF FALSE, GOES TRUE. |
| X | ✓ | X | FALSE |
| X | ✓ | ✓ | ? |
| ✓ | X | X | TRUE |
| ✓ | X | ✓ | ? |
| ✓ | ✓ | X | ? |
| ✓ | ✓ | ✓ | ? |

FIG. 4

| REGISTER B | | | | 8-4-2-1 DECIMAL |
|---|---|---|---|---|
| B1 | B2 | B3 | B4 | REPRESENTATION |
| 1 | 1 | 1 | 1 | 15 |
| 0 | 1 | 1 | 1 | 7 |
| 1 | 0 | 1 | 1 | 11 |
| 0 | 1 | 0 | 1 | 5 |
| 1 | 0 | 1 | 0 | 10 |
| 1 | 1 | 0 | 1 | 13 |
| 0 | 1 | 1 | 0 | 6 |
| 0 | 0 | 1 | 1 | 3 |
| 1 | 0 | 0 | 1 | 9 |
| 0 | 1 | 0 | 0 | 4 |
| 0 | 0 | 1 | 0 | 2 |
| 0 | 0 | 0 | 1 | 1 |
| 1 | 0 | 0 | 0 | 8 |
| 1 | 1 | 0 | 0 | 12 |
| 1 | 1 | 1 | 0 | 14 |

B1 = B1 ⊕ B4
B2 = B1
B3 = B2
B4 = B3

CONFIGURATION OF MATRIX 12 (STATIC COUNT=0)

FIG. 5

| REGISTER B | | | | 8-4-2-1 DECIMAL |
|---|---|---|---|---|
| B1 | B2 | B3 | B4 | REPRESENTATION |
| 0 | 0 | 0 | 0 | 0 |
| 1 | 0 | 0 | 0 | 8 |
| 0 | 1 | 0 | 0 | 4 |
| 1 | 0 | 1 | 0 | 10 |
| 0 | 1 | 0 | 1 | 5 |
| 0 | 0 | 1 | 0 | 2 |
| 1 | 0 | 0 | 1 | 9 |
| 1 | 1 | 0 | 0 | 12 |
| 0 | 1 | 1 | 0 | 6 |
| 1 | 0 | 1 | 1 | 11 |
| 1 | 1 | 0 | 1 | 13 |
| 1 | 1 | 1 | 0 | 14 |
| 0 | 1 | 1 | 1 | 7 |
| 0 | 0 | 1 | 1 | 3 |
| 0 | 0 | 0 | 1 | 1 |

B1 = B1 ⊙ B4
B2 = B1
B3 = B2
B4 = B3

CONFIGURATION OF MATRIX 12 (STATIC COUNT=15)

FIG. 6

| REGISTER B | | | | 8-4-2-1 DECIMAL |
|---|---|---|---|---|
| B1 | B2 | B3 | B4 | REPRESENTATION |
| 1 | 1 | 1 | 1 | 15 |
| 0 | 1 | 1 | 1 | 7 |
| 0 | 0 | 0 | 1 | 1 |
| 1 | 1 | 0 | 0 | 12 |
| 1 | 0 | 0 | 0 | 8 |
| 0 | 1 | 1 | 0 | 6 |
| 1 | 1 | 0 | 1 | 13 |
| 0 | 1 | 0 | 0 | 4 |
| 1 | 1 | 1 | 0 | 14 |
| 1 | 0 | 1 | 1 | 11 |
| 1 | 0 | 0 | 1 | 9 |
| 1 | 0 | 1 | 0 | 10 |
| 0 | 1 | 0 | 1 | 5 |
| 0 | 0 | 1 | 0 | 2 |
| 0 | 0 | 1 | 1 | 3 |

B1 = B2 ⊕ B4
B2 = B1 ⊕ B2 ⊕ B4
B3 = B1 ⊕ B2 ⊕ B3
B4 = B3

CONFIGURATION OF MATRIX 12 (STATIC COUNT=0)

FIG. 7

| REGISTER B | | | | 8-4-2-1 DECIMAL |
|---|---|---|---|---|
| B1 | B2 | B3 | B4 | REPRESENTATION |
| 1 | 1 | 1 | 1 | 15 |
| 1 | 1 | 0 | 1 | 13 |
| 0 | 1 | 0 | 0 | 4 |
| 1 | 0 | 1 | 0 | 10 |
| 0 | 1 | 1 | 1 | 7 |
| 1 | 0 | 1 | 1 | 11 |
| 0 | 0 | 0 | 0 | 0 |
| 1 | 0 | 0 | 0 | 8 |
| 1 | 1 | 1 | 0 | 14 |
| 0 | 1 | 0 | 1 | 5 |
| 0 | 0 | 1 | 0 | 2 |
| 0 | 0 | 0 | 1 | 1 |
| 0 | 0 | 1 | 1 | 3 |
| 1 | 0 | 0 | 1 | 9 |
| 0 | 1 | 1 | 0 | 6 |

B1 = B3 ⊙ B4
B2 = B1
B3 = B1 ⊕ B2
B4 = B3

CONFIGURATION OF MATRIX 12 (STATIC COUNT=12)

| NON-SHIFT REGISTER B ||| 
|---|---|---|
| SEQUENCE | CONFIGURATION OF MATRIX 12 | STATIC COUNT(S) |
| 1,8,6,11,7,3;14,13,12,4,2,9;15,5,10 | $\begin{cases} B1 = B3 \oplus B4 \\ B2 = B1 \\ B3 = B1 \oplus B2 \\ B4 = B3 \end{cases}$ | 0 |
| 14,7,9,4,8,12;1,2,3,11,13,6;0,10,5 | $\begin{cases} B1 = B3 \odot B4 \\ B2 = B1 \\ B3 = B1 \odot B2 \\ B4 = B3 \end{cases}$ | 15 |
| 15,7,1,10,13,14;11,5,8,4,0,2;12,6,9 | $\begin{cases} B1 = B3 \oplus B4 \\ B2 = B1 \\ B3 = B1 \odot B2 \\ B4 = B3 \end{cases}$ | 3 |
| 15,13,4,10,7,11;0,8,14,5,2,1;3,9,6 (SHOWN IN FIGURE 7) | $\begin{cases} B1 = B3 \odot B4 \\ B2 = B1 \\ B3 = B1 \oplus B2 \\ B4 = B3 \end{cases}$ | 12 |
| 14,13,6,1,8,12;11,7,9,4,2,3;15,5,10 | $\begin{cases} B1 = B1 \oplus B4 \\ B2 = B1 \\ B3 = B2 \oplus B3 \\ B4 = B3 \end{cases}$ | 0 |
| 14,7,3,1,2,9;13,12,4,8,6,11;10,5,0 | $\begin{cases} B1 = B1 \odot B4 \\ B2 = B1 \\ B3 = B2 \odot B3 \\ B4 = B3 \end{cases}$ | 15 |
| 15,7,11,5,8,14;13,4,0,2,1,10;9,6,3 | $\begin{cases} B1 = B1 \oplus B4 \\ B2 = B1 \\ B3 = B2 \odot B3 \\ B4 = B3 \end{cases}$ | 12 |
| 15,13,14,5,2,11;10,7,1,0,8,4;12,6,9 | $\begin{cases} B1 = B1 \odot B4 \\ B2 = B1 \\ B3 = B2 \oplus B3 \\ B4 = B3 \end{cases}$ | 3 |
| 15,7,1,12,8,6,13,4,14,11,9,10,5,2,3 (SHOWN IN FIGURES 6 AND 10) | $\begin{cases} B1 = B2 \oplus B4 \\ B2 = B1 \oplus B2 \oplus B4 \\ B3 = B1 \oplus B2 \oplus B3 \\ B4 = B3 \end{cases}$ | 0 |

FIG.9

| PRESETS ||| REGISTER CONTENT |||||| OUTPUT | ACTIVITY |
|---|---|---|---|---|---|---|---|---|---|
| CYCLES 38 | WORDS 36 | A 15 | CYCLE 25 | WORD 21 | BIT 20 | A | B | 26 | |
| 21 | 9 | 14 | D₁ | W₁ | P₁ | 1110 | 0000 | | { REGISTER A FOLLOWS PRESET 15, MATRIX 12 IS ACTIVATED ACCORDING TO PRESET 13. |
| | | | | | P₂ | | 0110 | | |
| | | | | | P₃ | | 1000 | | |
| | | | | | P₄ | | 1011 | | |
| | | | | | P₅ | | 1011 | | |
| | | | ↓ | ↓ | P₆ | ↓ | 1011 | -11- | { FIRST WORD APPEARS AT OPERATOR'S CONSOLE. REGISTER A FOLLOWS REGISTER B. REGISTER B IS RESET. |
| | | | | W₂ | P₁ | 1011 | 0000 | | |
| | | | | | P₂ | | 0110 | | |
| | | | | | P₃ | | 0110 | | |
| | | | | | P₄ | | 0101 | | |
| | | | | | P₅ | | 1001 | | |
| | | | | ↓ | P₆ | ↓ | 1001 | -9- | |
| | | | | W₃ | P₁ | 1001 | 0000 | | |
| | | | | | P₂ | | 0110 | | |
| | | | | | P₃ | | 0110 | | |
| | | | | | P₄ | | 0110 | | |
| | | | | | P₅ | | 1010 | | |
| | | | | ↓ | P₆ | ↓ | 1010 | -10- | |
| | | | | W₉ | P₁ | 1111 | 0000 | | |
| | | | | | P₂ | | 0110 | | |
| | | | | | P₃ | | 1000 | | |
| | | | | | P₄ | | 1011 | | |
| | | | | | P₅ | | 0111 | | { LAST WORD APPEARS AT OPERATOR'S CONSOLE. COMPARATOR 92 EMITS SIGNAL. REGISTER A FOLLOWS PRESET 15. |
| | | | | | P₆ | | 0111 | -7- | |
| | | | D₂ | W₁ | P₁ | 1110 | 0000 | | |
| | | | | | P₂ | | 0110 | | |
| | | | | | P₃ | | 1000 | | |
| | | | | | P₄ | | 1011 | | |
| | | | | | P₅ | | 1011 | | |
| | | | ↓ | ↓ | P₆ | ↓ | 1011 | -11- | |
| | | | D₂₁ | W₉ | P₁ | 1111 | 0000 | | |
| | | | | | P₂ | | 0110 | | |
| | | | | | P₃ | | 1000 | | |
| | | | | | P₄ | | 1011 | | |
| | | | | | P₅ | | 0111 | | { COMPARATOR 94 EMITS SIGNAL. FLIPFLOP S₂ IS SET. SIGNAL C IS CUT OFF. SIGNAL S₂ APPEARS AT OPERATOR'S CONSOLE |
| ↓ | ↓ | ↓ | ↓ | ↓ | P₆ | ↓ | 0111 | -7- | |

FIG.11

United States Patent Office 3,353,157
Patented Nov. 14, 1967

3,353,157
GENERATOR FOR VARIABLE AND REPETITIVE SEQUENCES OF DIGITAL WORDS
Donald J. Chesarek, San Jose, and Harold E. Petersen, Saratoga, Calif., assignors to International Business Machines Corporation, New York, N.Y., a corporation of New York
Filed Sept. 28, 1964, Ser. No. 399,598
7 Claims. (Cl. 340—172.5)

ABSTRACT OF THE DISCLOSURE

A digital word generator operable through computer control of a network of logical gates and including a pair of registers in which words are set up in a sequence established by the network, the first word, number of words and the number of sequences also being established by the network as accordingly arranged by switch matrices available to the operator of the computer.

This invention relates to a digital word generator and, more particularly, to a generator which utilizes digital techniques to produce series of multi-bit words, each word bearing a designated relationship to the others, said relationship capable of being changed.

Word generators, as used in the switching and computer arts, are employed usually to establish a unique combination of bits (i.e., words) for each of a plurality of inputs signals ("clock" pulses). The number of bit combinations and their relationship is determined by the number of stages in the generator and by the "logical network" which provides the interconnections between the stages. As an illustration, a three-stage register in which the stages comprise any of the well known bistable-state circuits (flip-flops), may be considered. The two inputs and two outputs for each flip-flop may feed into a logical network which interconnects them to provide, for repetitive clock pulse input (i.e., during sequential bit periods of operation), a counting sequence of all eight words available from a three-stage register, an abbreviated counting sequence (e.g., five words followed by reset to the first word), a shift sequence of maximum length or less, etc. With particular respect to the generation of maximum-length shift sequences, designated in the error checking art as $m$-sequences, the logical network for the three-stage register B, comprising flip-flops B1, B2, B3 (nomenclature to be explained later), may be arranged such that the input of first stage B1 is the "exclusive OR" function of the output of second and third stages B2 and B3, whereas second stage B2 follows first stage B1 and third stage B3 follows second stage B2. This may be represented by the set of Boolean application equations: $B1 = B2 \oplus B3$, $B2 = B1$, $B3 = B2$. The register, when preset with any word except 000 (this word may be considered as comprising a trivial sequence or "static" count) and repetitively excited by clock pulses, will sequentially generate all seven possible different words (except 000), 111, 011, 001, 100, 010, 101, 110, and then repeat.

On the other hand, the logical network may be arranged such that the input to first stage B1 is the "equals" function of the outputs of stages B2 and B3, the other two stages being connected as before: $B1 = B2 \ominus B3$, $B2 = B1$, $B3 = B2$. In this case also, the register, when preset with any word except 111 (the static count) and repetitively excited by clock pulses, will sequentially generate all seven words (except 111), but in a different order, 000, 100, 110, 011, 101, 010, 001, and then repeat. These two sequences will be recognized as complemetary.

It will also be noted that the above two logical network arrangements cause stage B1 to operate as a summer stage since it indicates the result of the modulo 2 addition of the content of other stages of the register.

Further, by arranging the logical network to connect the register as represented by the application equations $B1 = B1 \oplus B3$, $B2 = B1$, $B3 = B2$, the $m$-sequence 111, 011, 101, 010, 001, 100, 110 (static count 000) is obtained, and, by arranging the logical network to connect the register as represented by the equations $B1 = B1 \ominus B3$, $B2 = B1$, $B3 = B2$, the $m$-sequence 000, 100, 010, 101, 110, 011, 001 (static count 111) is obtained. These two sequences are also recogized as complementary.

It will be noted that the last two logical network arrangements cause stage B1 to operate as an accumulator stage since it indicates the result of a modulo 2 addition of the content of at least one other stage to its own prior content.

It is additionally interesting to note that the logical network $B1 = B1 \oplus B2$, $B2 = B1$, $B3 = B2$ yields the short cycle 011, 101, 110 and the logical network $B1 = B1 \ominus B2$, $B2 = B1$, $B3 = B2$ yields the complementary cycle 100, 010, 001 and it is possible that, in registers comprising a greater number of stages, networks corresponding to other logical connectors may yield additional counting sequences, cyclic or otherwise.

It has been customary in the past to arrange the logical network in contemplation of the sequential outputs it is desired to obtain. Thus, in a digital data transmission system in which capability to check single errors is to be included, selection of bit positions to be checked by the individual check bits which will accompany the message bits may be made in accordance with an $m$-sequence. Such systems therefore may include $m$-sequence generators in both the transmitter and receiver. If the transmission fidelity should indicate the desirability of enhancing the error checking ability of the system to the handling a burst errors, or of the desirability of handling messages of greater length, some means must be provided to replace the $m$-sequence generators with ones of increased size. This has required a major alteration in station equipment, usually at considerable expense and system inactivity. It is an object of this invention to provide a word generator sufficiently versatile in construction so as to avoid these disadvantages.

It is another object of this invention to provide a word generator the internal logical network of which enables selective alteration of the word sequence output within a wide range of sequences, both of a full number of words or a reduced number of words, thereby lending usefulness in counting, selecting, indicating, security of data transmitted over shared communications links, security of shared memories and other applications.

It is still another object of this invention to present an approach to the construction of binary counters and word generators characterized by simplicity of logic and the production, where required, of a maximum number of unique outputs for the equipment used.

The foregoing and other objects, features and advantages of the invention will be apparent from the following more particular description of a preferred embodiment of the invention, as illustrated in the accompanying drawings.

FIGURE 2 is the block diagram representation and truth table depicting the logic of an R–S bistable state circuit, used in the embodiment of the invention shown in FIGURES 10a and 10b.

FIGURE 3 is the block diagram representation and truth table depicting the logic of an R–S–T bistable state circuit, also used in the embodiment of the invention shown in FIGURES 10a and 10b;

Figure 10A:
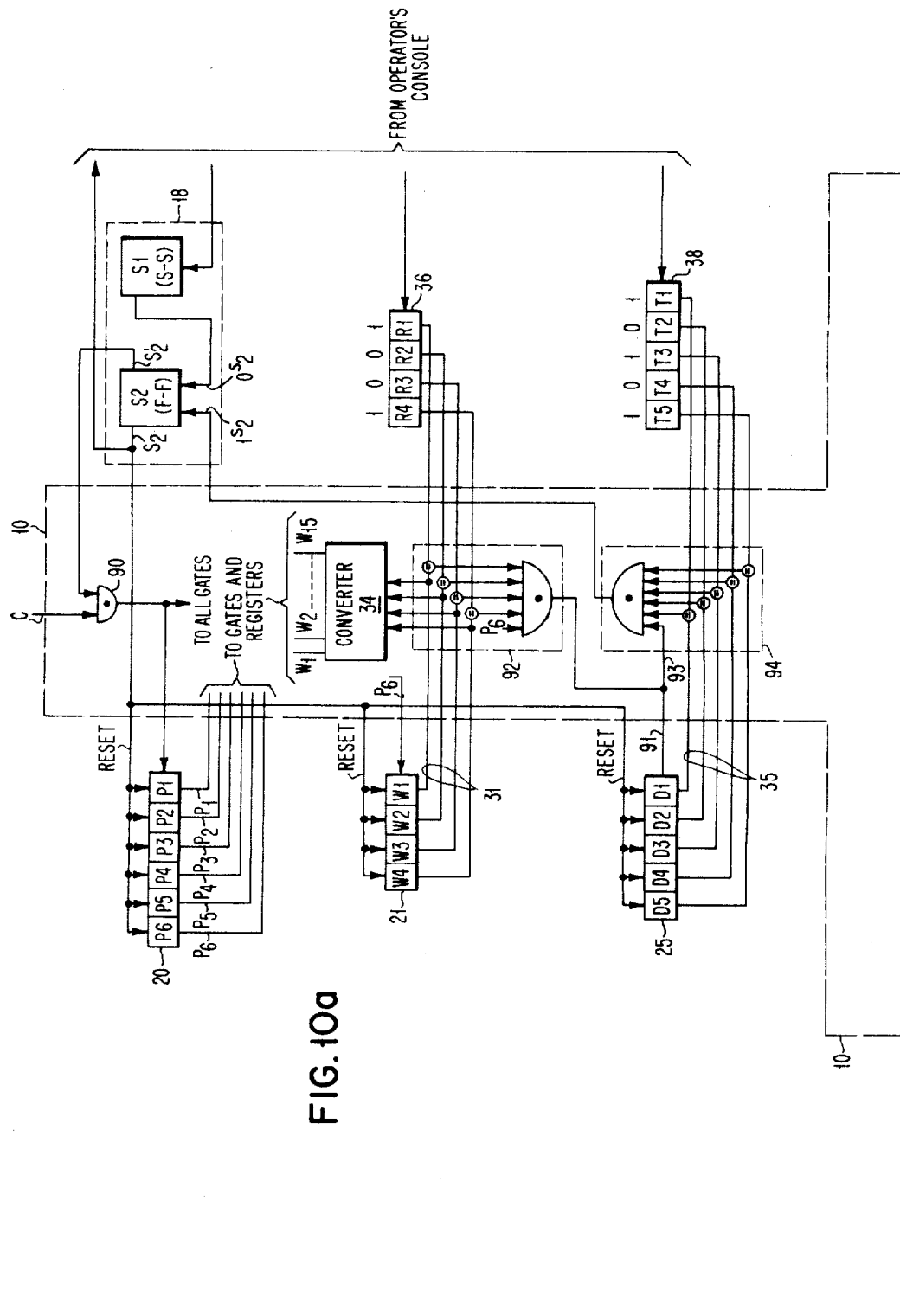
Figure 10B:
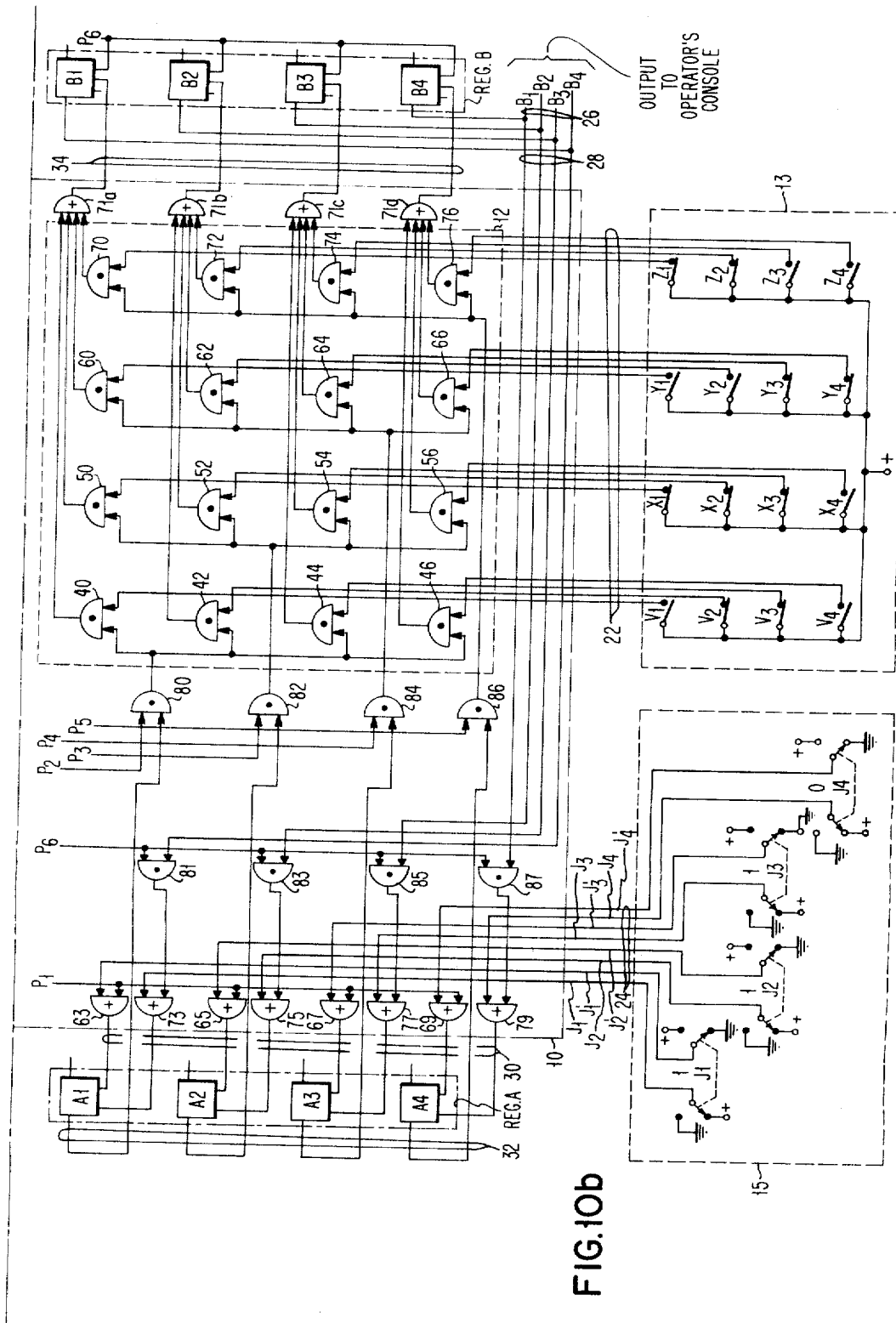

FIGURES 4, 5, 6, and 7 are tables depicting typical sequences of words, in binary and decimal representation, available from the word generator of FIGURES 10a and 10b when its changeable matrix is set up in accordance with the logic (application equations) given with each table;

FIGURE 8 is a table depicting cyclic word sequences available from the word generator of FIGURES 10a and 10b when its changeable matrix is set up in accordance with the indicated logic, for which register B is a shift register;

FIGURE 9 is a table depicting some of the cyclic word sequences available from the word generator FIGURES 10a and 10b when its changeable matrix is set up in accordance with the indicated logic, for which register B is not a shift register;

FIGURES 10a and 10b together form a schematic diagram of a word generator according to the invention and having its changeable matrix preset to produce the specific maximum length cyclic shift sequence of 4-bit words according to the logic of FIGURE 6, and employing R–S and R–S–T flip-flops in its registers; and FIGURE 11 comprises a tabulation of some of the activity of the example of the system given in FIGURE 10 when preset as indicated.

Figure 1:
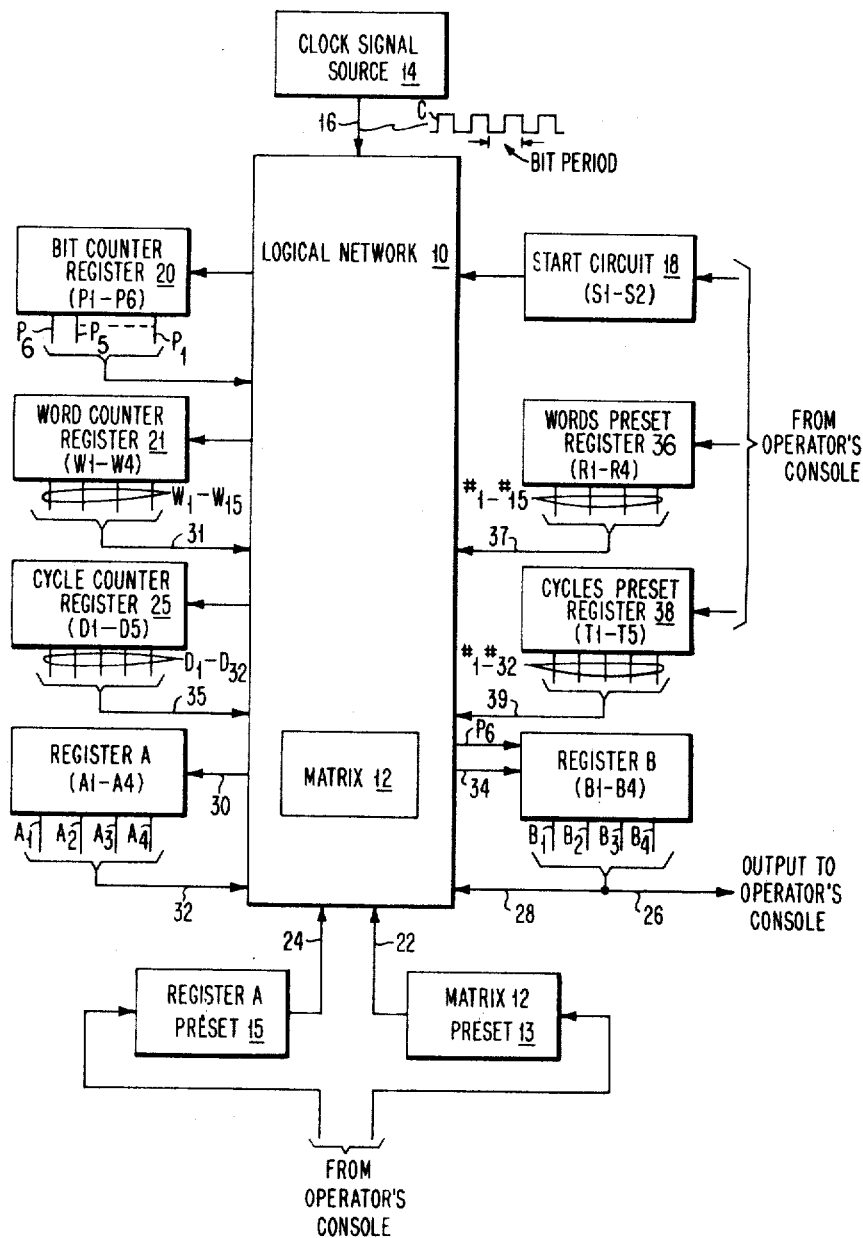
FIGURE 1 is a generic block diagram into which the word generator of the present invention fits.

The present invention contemplates the integration of the aforementioned word generation technique into a computer system capable of storing numbers as combinations of "true" and "false" states in a set of bistable state circuits such as flip-flops, as bistate magnetic recordings on a magnetizable surface, as the two states of remanent magnetization of magnetic cores, or as some other well known form (i.e., mechanization) of binary representation, and involves the sequential operation of what has come to be recognized as computer structure, including pulse sources, AND gates, OR gates, etc. Very generally, the system of the present invention may be regarded as comprised of bistable-state circuits, a source of clock signals for synchronization, a clock signal counter to indicate time periods during which the system outputs may be recognized, various other counters, switch means to preset portions of the system and a "logical" network capable of responding to and controlling the operation of the combination of components to be described. This generic representation is shown in FIGURE 1, which, for the purposes of this specification, contemplates the generation of 4-bit words and employs a pair of 4-stage registers, designated as registers A and B, connected to logical network 10. Logical network 10 is operative to enter information into, remove information from, and sequence the operation of registers A and B such that the combination comprises a word generator, as distinguished from other equipment, the output words being available (from register B) on line 26 as indicated, which, as with other lines in the system, comprises a plurality of conductors, in this case, designated $B_1$, $B_2$, $B_3$ and $B_4$. A portion of logical network 10, namely, matrix 12, is changeable, i.e., its configuration, and consequently the logic it contributes, may be altered by an operator; this is represented by preset circuit 13 which connects to matrix 12 by line 22. Also available to the operator is preset circuit 15 connecting by line 24 to register A, in which a particular first word may be set up for subsequent transfer to and read-out from register B.

Although the inventive concept is quite applicable to other systems of representing information in a computer, it will be presented herein with regard to a synchronized pulse system. By this is meant a system in which repetitive pulses, whether information representing, or clock signals, or otherwise, are synchronized to occur at particular time intervals with reference to each other. In such a system, signals may be of square wave shape alternating between specific voltage levels; and it is most convenient to regard synchronization as being provided by clock signals of symmetrical square wave shape generated by a pulse generator, which may comprise a repetitive magnetic recording associated with a sensing electromagnetic transducer and pulse shaping circuitry, or a frequency controlled square wave generator, or other appropriate means. Synchronization by such means implies that the potential of a line may change between the voltage levels only at the time of the trailing edge of the clock signal pulse, the time between trailing edges being designated as a bit period.

In FIGURE 1, the aforementioned bit periods are established by clock signal source 14 which emits symmetrical square wave signal C on line 16; through logical network 10, lines connecting to line 61 provide signal C input to all gates.

It is appropriate, before going into a description of the details of the circuitry of the invention as applied to specific examples, to describe the convention employed herein for nomenclature.

The circuits of the invention are used to perform logical operations (AND, OR, etc.) and are represented in the form of equations shown in Boolean notation. The terms of the equations are mechanized in circuitry by output signals from flip-flops, single-shots and switches, which are electronic devices having two possible steady state conditions. One of these conditions is referred to as "true" or "set" and the other condition is referred to as "false" or "reset"; when for instance, a flip-flop is described as being true or set, it will be understood to be storing a binary digit one (bit 1), and when it is described as a false or reset, it will be understood to be storing a binary digit zero (bit 0).

Input signals to the flip-flop are supplied by gates and output signals from the flip-flop are supplied to similar gates. These gates comprise logical network 10 and it is their operation that is described by means of Boolean equations, each of which thus defines the triggering of the bistable circuit. The terms of an equation correspond to output signals and the equation represents the activation of gates and, consequently, the generation of input signals, during the aforementioned bit periods, triggering actually occurring at the end of the bit period, so that the circuits are in the desired states during the next bit period.

The nomenclature used for the present invention employs combinations of letters and numbers for designating the terms of the equations. The bistable circuits themselves are designated by combinations of capital letters and numbers: thus, flip-flops A1, B3, etc. The output signals of the flip-flop are complementary, and one is characterized by a corresponding capital letter with the associated number shown as a subscript: thus, signals $A_1$, $B_3$, etc.; the other is accompanied by an affixed prime: thus, signals $A_1'$, $B_3'$, etc. It will be understood that, in circuitry, the output signals usually comprise a pair of voltage levels, one high and one low, on a line, and, when the unprimed signal output of a flip-flop is high in voltage and the primed signal output is low in voltage, the flip-flop is true, while, for the reverse condition, the flip-flop is false; thus, flip-flop A1 is true when signal $A_1$ is at the high voltage level and signal $A_1'$ is at the low voltage level.

On the other hand, the input signals to the flip-flops, which usually take the form of sharp pulses occuring at the trailing edge of a clock signal, i.e., at the end of a bit period, are designated by corresponding lower case letters with the associated number shown as a subscript. The input signal for setting the flip-flop is designated by a subscript 1 prefixing the lower case letter: thus, signals $_1a_1$, $_1b_3$, etc. The input signal for resetting the flip-flop is designated by a subscript 0 prefixing the lower case letter: thus, signals $_0a_1$, $_0b_3$, etc. These two signals are the only ones required to be specified for the R–S flip-flop; for the R–S–T flip-flop, with which the invention will also be exemplified, the input effective to change its state is designated by a subscript t prefixing the lower case letter: thus, signal $_1b_1$, etc. For reference, the block diagram representation and truth tables corresponding to these flip-flops are shown in FIGURES 2 and 3. It is apparent that the R–S–T flip-flop with AND gates at its inputs and the R–S flip-flop with exclusive OR gates at its inputs are logical equivalents.

Those familiar with the art will readily recognize these flip-flops and that use may be made of any type, such as the D, T or J–K described at pages 121 through 132 of the book Logical Design of Digital Computers by M. Phister, Jr., Wiley and Sons, Inc., New York, 1958, for either register or for any portion of the system where bistability is required, without affecting the inventive concept. However, the structure of network 10 will, of course, require modification in accordance with the logic (i.e., the characteristic equations) of the selected circuits.

Returning now to FIGURE 1, the function of bit counter register 20 is to count pulses of signal C and to generate, on its output lines, equal, sequential and cyclical signals $P_1$ through $P_6$, from its flip-flops P1 through P6, for which the process of generating each word will coincide. Register 20 cooperates with gates in network 10 to provide a binary counter of signal C pulses; only one of the output lines from register 20 at a time may be at the high potential for enabling gates in network 10. Register 20 responds to 6 sequential pulses of signal C and then recycles; thus, by noting the output of register 20, succeeding bit periods may be identified and network 10 set up to provide the appropriate logic for generating the word. Also, register 20 is reset by start circuit 18 when the last word of the last cycle is generated.

The time period required to generate a word is designated a word period; these are tallied by word counter register 21 as counts $W_1$ through $W_{15}$, each appearing as a unique combination of signals on the four conductors of line 31. Word counter register 21 advances in response to a period $P_6$ pulse and is reset to $W_1$ by start circuit 18.

Counters such as registers 20 and 21 are well known to be capable of providing the basic timing sequence which controls the activation of appropriate portions of equipment familiar in computer technology, such as the gates in network 10 in the present case.

Network 10 also serves to route control information in a manner appropriate to perform the desired word generation. Thus, presets of register A and matrix 12 are transferred from preset circuits 15 and 13, respectively (switches on the operator's control panel, not shown in FIGURE 1) via lines 24 and 22, respectively, to network 10. The register A preset, as well as the different register B outputs each representing a word, are conveyed by lines 28 and 30 to register A where they are set up in flip-flops A1 through A4 at the appropriate bit periods. The register A outputs, designated $A_1$, $A_2$, $A_3$ and $A_4$ on line 32, feed into network 10, where they are arithmetically handled by matrix 12 to form a new word and set up through line 34 in register B. The generated word appears on output line 26 connecting to register B.

It has been pointed out that a reduced-length sequence of words may be generated repetitively by this generator. This is accomplished by resetting register 21, utilizing words preset register 36 and line 37, at a specific number equal to or less than the maximum number of words of which register 21 is capable (here, 15) and presetting register A preset 15 according to a specific word. As a result, the selected number of words starting with the specific word is repetitively generated on line 26.

In a similar fashion, the present system provides a means for generating a designated number of cycles of words if continuous operation of the generator is not desired. This comprises cycle counter register 25 which, if reset at a specific count, by cycles preset register 38 and line 39, will provide the designated number of cycles of the sequence selected by register 21 and matrix 12. Although a maximum of 32 counts, $D_1$, $D_2$, $D_3$ . . . $D_{32}$, on line 35, is shown for register 25, it should be understood that this is only illustrative since any number of counts may be arranged for by altering its stage content.

The invention, in one embodiment, provides a word generator utilizing circuitry the operation of which may be represented as a system of linear equations. Considering, for example a requirement for a sequence of 15 different four-bit words, these may be provided, using a four-stage shift register, as the combinational states of flip-flops by regarding the voltages on corresponding outputs of the flip-flops.

Such a register may comprise four stages B1, B2, B3 and B4, operating in accordance with the tables shown in FIGURES 4, 5, 6 and 7. If the triggering equations for each flip-flop are derived from the tables, it will be found that they may be summarized in the form of the application equations written below the tables. The equation $B1=B1\oplus B4$ of FIGURE 4, for instance, signifies that the state of flip-flop B1 during the bit period will be defined by an exclusive OR ($\oplus$) connection of the outputs of flip-flops B1 and B4 during the next prior bit period; i.e., that flip-flop B1 will trigger true if the modulo 2 sum of the states of flip-flop B1 and B4 is "one," i.e., if flip-flops B1 and B4 were priorly in different states, but will trigger false if the modulo 2 sum of these flip-flops is "zero," i.e., if flip-flops B1 and B4 were priorly in the same state. The corresponding triggering equations are $_1b_1=B_1B_4'+B_1'B_4$ and $_0b_1=B_1B_4+B_1'B_4'$. The equation $B1=B1\ominus B4$ of FIGURE 5 is similarly interpreted except that the logical connective is not the exclusive OR but the EQUALS, signifying that flip-flop B1 will trigger true if flip-flop B1 and B4 were priorly in the same state but will trigger false if the states were different. The corresponding triggering equations are $_1b_1=B_1B_4+B_1'B_4'$ and $_0b_4=B_1B_4'+B_1'B_4$. The equations for flip-flops B2, B3 and B4 in FIGURES 4 and 5 simply indicate that the states of these flip-flops follow those of their predecessors, i.e., that the register is connected by network 10 as a shift register for the purposes of generating these word sequences. The corresponding triggering equations are $_1b_2=B_1$ $_0b_2=B_1'$ $_1b_3=B_2$ $_0b_3=B_2'$ $_1b_4=B_3$ and $_0b_4=B_3'$. It will be noted that these sequences are $m$-sequences and complementary.

If the requirement is for a cyclic sequence of the following six different words 15, 7, 3, 9, 12, 14, it is indicated in FIGURE 8 that matrix 12 must provide connections represented as $B1=B2\oplus B4$, $B2=B1$, $B3=B2$, $B4=B3$, and the register initially be set with one of the words in this sequence, such as the all-ones count 15. It is shown in this figure that the six-word sequence 1, 8, 4, 10, 5, 2 is also available from the same configuration of matrix 12 if its preset is with one of the words of this sequence. Additionally available from the same configuration of matrix 12 is the three-word sequence 6, 11, 13 if the shift register is preset with one of these words. In summary, the table of FIGURE 8 shows the cyclic sequences available from four-stage register B connected as a shift register and governed by the corresponding configurations of matrix 12, the register being preset with one of the sequence words.

Additionally, if matrix 12 connects register B as one other than a shift register, with appropriate initial set by register A preset 15 (FIGURE 1), other word sequences would be made available. The table in FIGURE 9 indicates a few of these sequences and the corresponding logic configurations.

It will also be made apparent that, by utilizing register A preset 15 to provide an override, a reduced number of counts of a sequence is established by the initial set by matrix 12 preset 13. Thus, referring to FIGURE 4, for instance, if the generator output requirement is for seven cycles of just the counts 5, 10, 13, 6, 3 and 9 of the $m$-sequence shown, the preset of matrix 12 is established as represented by the equations accompanying the figure, the preset of register A is established at count 5, words preset register 36 is arranged to provide a cyclic count of six word periods by word counter register 21, and cycles preset register 38 is arranged to provide seven cycles of operation in cycle counter register 25, which will then interrupt the energization of network 10 by clock signal source 14 via start circuit 18.

It should be noted from the above that there are provided four presets which establish the operating characteristics of the word generator: for register A (preset 15), for matrix 12 (preset 13), for word counter register 21 (register 36) and for cycle counter register 25 (register 38). By appropriately combining these presets at the operator's console, a remarkable word generating capability results; for instance, there may be arranged emission of the following:

|  | Preset 13 | Preset 15 | Register 36 | Register 38 |
|---|---|---|---|---|
| 7 cycles of the 15-word m-sequence of Figure 4 | Logic of Fig. 4 | Any number 1–15 | 15 | 7 |
| 1 cycle of the top 6-word sequence of Figure 7 | Logic of Fig. 7 | Any of 15, 13, 4, 10, 7, 11 | 6 | 1 |
| 31 cycles of the eight words 12 through 9 of Figure 6 | Logic of Fig. 6 | 12 | 8 | 31 |

The above operating features are more particularly illustrated in FIGURES 10a and 10b, which together form a schematic diagram depicting a generator of 4-bit words specifically set up to produce 15 words cyclically; the generator arrangement is represented by the equations shown below the diagram, which is the last entry in the table of FIGURE 9 and for which the binary counts are given in FIGURE 6.

It is seen that the settings for start circuit 18 and registers 36 and 38 originate with the operator. Start circuit 18 comprises a bistable state device, single-shot S1, which triggers the reset input to flip-flop S2: $_0s_2 = S_1$. Output $S_2'$ opens AND gate 90 in logical network 10 to pass signal C to all gates. In the interest of simplicity in the presentation of the figure, all connections for signal C are not shown nor is the term included in the equations, although it should be understood that, since, as already mentioned, preferance is for a synchronous system, these connections are made and all equation terms are logically multiplied (logical AND) by signal C.

Bit counter register 20 comprises flip-flops P1 through P6 and is activated by the output of gate 90 to provide its sequential outputs. The register is reset to zero by signal $S_2$ which is at the high level when the last word of the last cycle is generated. The logic in network 10 governing the operation of register 20 is as follows: $_1p_1 = P_1'S_2'$
$_1p_2 = P_1 \quad _1p_3 = P_2 \quad _1p_4 = P_3 \quad _1p_5 = P_4 \quad _1p_6 = P_5 \quad _0p_1 = P_1 + S_2$
$_0p_2 = P_1' + S_2 \quad _1p_3 = P_2' + S_2 \quad _0p_4 = P_3' + S_2 \quad _0p_5 = P_4' + S_2$
$_0p_6 = P_5' + S_2$.

Signal $P_6$ activates word counter register 21 to increase its count, thereby providing on its combined output lines 31 a decimal indication of the word of the sequence being generated. The decimal count is converted by converter 33 to signals on individual lines $W_1$ through $W_{15}$ according to the following logic:

$$W_1 = W_1 W_2' W_3' W_4'$$
$$W_2 = W_1' W_2 W_3' W_4'$$
$$W_3 = W_1 W_2 W_3' W_4'$$
$$\vdots$$
$$W_{15} = W_1 W_2 W_3 W_4$$

The logic for generating the decimal counts will not be given here since it is considered to be taught in the Phister book already referenced.

The count, in decimal form, is compared in comparator 92 with the setting in words preset register 36, which comprises flip-flops R1, R2, R3 and R4 and, if there is equality, comparator 92 emits at period $P_6$ a pulse on line 91, the input to cycle counter register 25 and on line 93. The comparison logic is:

$$91 = 93 = [(R1 \ominus W1)(R2 \ominus W2)(R3 \ominus W3)(R4 \ominus W4)]P_6$$

Cycle counter register 25, comprising flip-flops D1 through D5, emits counts $D_1, D_2, \ldots D_{32}$ until comparator 94 indicates equality of its count with the setting of cycles preset register 38, comprising flip-flops T1 through T5, by pulsing $_1s_2$ input of flip-flop S2, thereby blocking gate 90. It will be noted that this last activity is restricted to period $P_1$ inasmuch as comparator 92 is gated to have an output at period $P_6$ and the output of comparator 92, through line 93, gates comparator 94. The logical equation for this activity is:

$$_1s_2 = [(T1 \ominus D1)(T2 \ominus D2)(T3 \ominus D3)$$
$$(T4 \ominus D4)(T5 \ominus D5)]93$$

For the example in FIGURES 10a and 10b, matrix 12 comprises 16 AND gates arranged in four columns (vertical) of four rows (horizontal), each column associated with the unprimed output (FIGURE 2) of one of the flip-flops of register A and each row associated with the $t$ input (FIGURE 3) of one of the flip-flops of register B. Thus, the columns include AND gates: 40, 42, 44 and 46; 50, 52, 54 and 56; 60, 62, 64 and 66; and 70, 72, 74 and 76. The rows include AND gates: 40, 50, 60 and 70; 42, 52, 62 and 72; 44, 54, 64 and 74; and 46, 56, 66 and 76. The outputs of the gates of a row are connected to an OR gate 71a, 71b, 71c or 71d, thus, gates 40, 50, 60 and 70 are connected to OR gate 71a, and the OR gate output leads to the $t$ input of the register B flip-flop. The matrix 12 AND gates have two inputs: a column input fed by the outputs of AND gates 80, 82, 84 and 86 and individual switch inputs through line 22 from preset circuit 13. AND gates 80, 82, 84 and 86 are opened to the unprimed outputs of the flip-flops of register A, respectively, by bit period signals $P_2$, $P_3$, $P_4$ and $P_5$, respectively, generated by bit counter register 20. The inputs to register A, gated at the bit periods shown, consist of the unprimed outputs of register B (via line 28) gated by signal $P_6$ through AND gates 81, 83, 85 and 87 and switch inputs from preset circuit 15 (via line 24) through OR gates 63, 65, 67 and 69 at their set inputs and 73, 75, 77 and 79 at their reset inputs. Additionally, the A register reset inputs are activated by bit period signal $P_1$ through gates 63, 65, 67 and 69.

In brief, in view of the system of logic presentation already given, the triggering connections of registers A and B made by logical network 10 are as follows:

$$_1a_1 = J_1 W_1 P_1 + B_1 W_{2-15} P_6$$
$$_0a_1 = J_1' W_1 P_1 + B_1' W_{2-15} P_6$$
$$_1a_2 = J_2 W_1 P_1 + B_2 W_{2-15} P_6$$
$$_0a_2 = J_2' W_1 P_1 + B_2' W_{2-15} P_6$$
$$_1a_3 = J_3 W_1 P_1 + B_3 W_{2-15} P_6$$
$$_0a_3 = J_3' W_1 P_1 + B_3' W_{2-15} P_6$$
$$_1a_4 = J_4 W_1 P_1 + B_4 W_{2-15} P_6$$
$$_0a_4 = J_4' W_1 P_1 + B_4' W_{2-15} P_6$$
$$_tb_1 = A_1 V_1 P_2 + A_2 X_1 P_3 + A_3 Y_1 P_4 + A_4 Z_1 P_5$$
$$_0b_1 = P_6$$
$$_tb_2 = A_1 V_2 P_2 + A_2 X_2 P_3 + A_3 Y_2 P_4 + A_4 Z_2 P_5$$
$$_0b_2 = P_6$$
$$_tb_3 = A_1 V_3 P_2 + A_2 X_3 P_3 + A_3 Y_3 P_4 + A_4 Z_3 P_5$$
$$_0b_3 = P_6$$
$$_tb_4 = A_1 V_4 P_2 + A_2 X_4 P_3 + A_3 Y_4 P_4 + A_4 Z_4 P_5$$
$$_0b_4 = P_6$$

The output signals on line 26 are, of course, $B_1$, $B_2$, $B_3$ and $B_4$ and should be sampled at period $P_6$.

From the foregoing discussion, it should be apparent that these triggering equations operate to accomplish the logic given by the application equations shown in FIGURE 6.

In order that there be an indication at the operator's console that the number of cycles of the present sequence has been generated, output signal $S_2$ is transmitted thereto. If the console is part of a computer system, this signal may be used to step the computer program unit through its flow diagram to pick up the next sequence and the required presets.

With regard to the operation of the system of FIGURES 10a and 10b, it will be presumed that words preset register 36 is storing the number 9, that cycles preset register 38 is storing the number 21, that register A preset 15 is at 14, that matrix 12 preset 13 corresponds to the logic given in FIGURE 6 and that bit counter register 20, word counter register 21 and cycle counter register 25 are reset. Referring to FIGURE 6, it is seen that these settings indicate that 21 cycles of the following nine words be generated: 14, 11, 9, 10, 5, 2, 3, 15, 7.

Triggering of single shot S1 at the operator's console by means of, for instance, a "start" button, resets flip-flop S2 to open gate 90 and remove the reset (signal $S_2$) to bit counter register 20, word counter register 21 and cycle counter register 25. Receipt of signal C causes bit counter register 20 to sequence through its six counts. At each count $P_6$ a pulse is entered into word counter register 21 and, if there is equality between the content of register 21 and words preset register 36, a pulse is entered during this bit period into cycle counter register 25. The table of FIGURE 11 indicates some of the system activity corresponding to this example; in the table, decimal numerals are indicated within a pair of horizontal dashes.

Some of the equipment shown in block diagram form has not been detailed here. Thus, the gates, converter 34 and comparators 92 and 94 are considered to be sufficiently known from their equations to require no further discussion.

While the invention has been particularly shown and described with reference to a preferred embodiment thereof, it will be understood by those skilled in the art that the foregoing and other changes in the form and details may be made therein without departing from the spirit and scope of the invention.

What is claimed is:
1. A word generator, comprising:
   first and second registers each capable of storing a word;
   a network for transfer of words between said registers;
   first preset means to establish the words transferred by said network in a sequence;
   second preset means to establish the first word in the sequence;
   third preset means to establish the number of words in the sequence; and
   fourth preset means to establish the number of sequences,

2. The generator of claim 1 wherein
   said registers comprise a plurality of stages and
   said network includes a plurality of gates at the input to the stages of said second registers and said first preset means includes switch means for selectively activating the gates at the input to the stages of said second register.

3. The generator of claim 2 wherein
   said network includes a plurality of gates at the inputs to the stages of said first register and said second preset means includes switch means for activating the gates at the inputs to the stages of said first register in accordance with a desired first word; and
   means to select between the switch means of said second preset means and said second register for transfer to said first register.

4. The generator of claim 3 wherein
   said third preset means comprises a third register set up with the number of words in a sequence,
   a counter for tallying the number of words transferred and
   a comparator responsive to said third register and said counter to emit an equality signal for energizing the gates of said network at the inputs to the stages of said first register.

5. The generator of claim 3; and
   a start circuit for initiating the operation of said network.

6. The generator of claim 5 wherein
   said fourth preset means comprises a fourth register set up with the number of sequences;
   a counter for tallying the number of sequences generated and
   a comparator responsive to said fourth register and said counter to emit an equality signal for controlling said start circuit.

7. The generator of claim 6 wherein
   said start circuit includes a bistable state circuit triggerable into one of its states at initiation of the operation of said network and into the other of its states by the equality signal emitted by said comparator of said fourth preset means.

References Cited

UNITED STATES PATENTS

| | | | |
|---|---|---|---|
| 3,046,545 | 7/1962 | Westerfield | 235—181 |
| 3,051,784 | 8/1962 | Neumann | 340—146.1 |
| 3,076,956 | 2/1963 | Hagan et al. | 340—172.5 |
| 3,114,130 | 12/1963 | Abramson | 340—146.1 |
| 3,119,097 | 1/1964 | Tullos | 340—168 |
| 3,128,449 | 4/1964 | Armstrong | 340—146.1 |
| 3,155,818 | 11/1964 | Goetz | 340—146.1 |
| 3,162,837 | 12/1964 | Meggitt | 340—146.1 |
| 3,283,131 | 11/1966 | Carbrey | 235—164 |
| 2,903,676 | 9/1959 | Ostendorf | 340—168 |
| 2,951,230 | 8/1960 | Cadden | 340—168 |
| 3,119,071 | 1/1964 | Euler et al. | 328—187 |

PAUL J. HENON, *Acting Primary Examiner.*
J. P. VANDENBURG, *Assistant Examiner.*